April 4, 1961
R. P. CAHN
2,978,522
DIOLEFIN MANUFACTURE
Filed Sept. 25, 1958
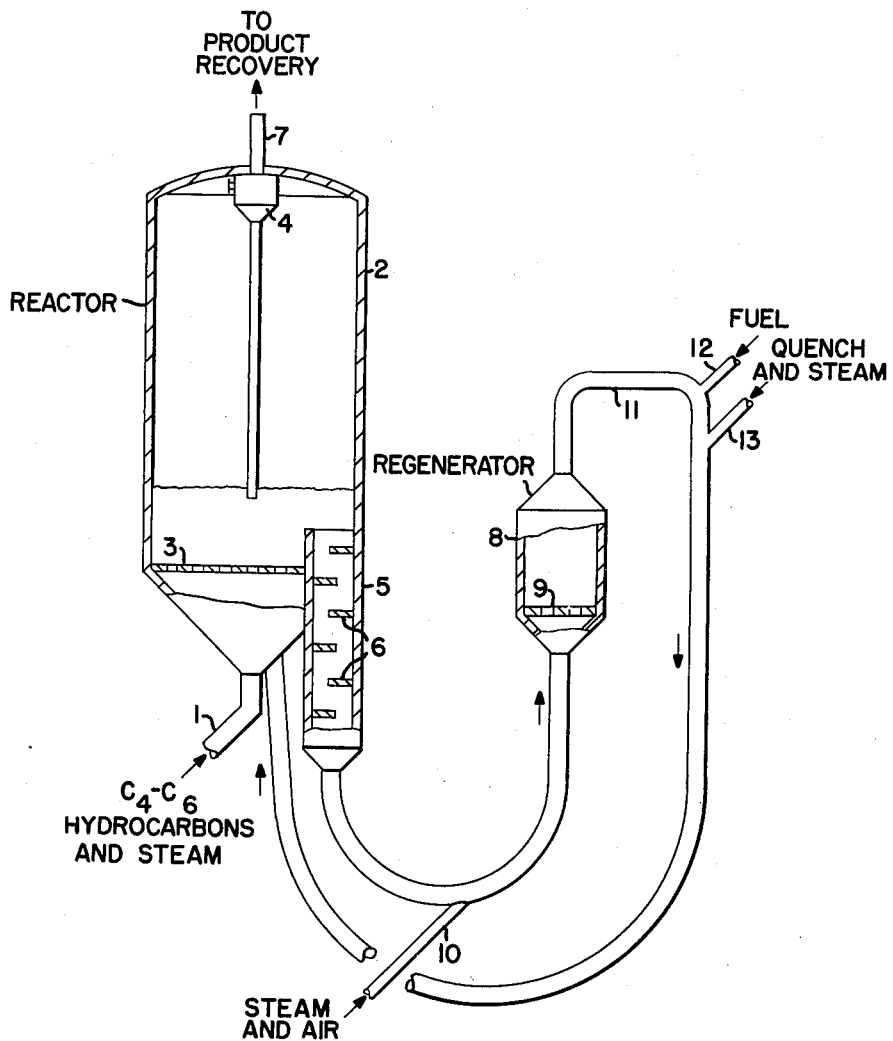
Robert P. Cahn   Inventor
By *Seymour Stahl*   Attorney

2,978,522
DIOLEFIN MANUFACTURE

Robert P. Cahn, Elizabeth, N.J., assignor to Esso Research and Engineering Company, a corporation of Delaware Filed Sept. 25, 1958, Ser. No. 763,233

12 Claims. (Cl. 260—680)

This invention relates to an improved method for the dehydrogenation of $C_4$–$C_6$ hydrocarbons more highly saturated than diolefins to diolefins. This group includes aliphatic paraffins and olefins, and cyclic paraffins and olefins but obviously does not include aromatics. More specifically, it relates to the dehydrogenation of a particular $C_4$–$C_6$ hydrocarbon from this group to its corresponding diolefin. Most specifically, this invention relates to a novel fluidized system for the dehydrogenation of butenes, isopentenes, isopentanes, 2,3-dimethyl butane or 2,3-dimethyl butenes to the corresponding diolefins, involving recycle of regeneration steam to the primary reactor. This application is a continuation-in-part of Serial No. 636,638, filed January 28, 1957, and now abandoned.

Processes for the dehydrogenation of butene to butadienes, isopentenes and isopentanes to isoprene, and 2,3-dimethyl butenes or 2,3-dimethyl butane to 2,3-dimethyl butadiene are known at this time. The importance of manufacture of these diolefins has in the past few years been increased by the mounting demand for rubber and rubber substituents as well as other polymer products employing these diolefins. For example, butadiene is used in synthetic rubber, isoprene is used in synthetic natural rubber and 2,3-dimethyl butadiene has been used as a substitute for isoprene. While many dehydrogenation catalysts are known to effect the conversion of paraffins and olefins to diolefins, in more recent years a catalyst comprising principally calcium nickel phosphate has been found to be extremely effective for this reaction. Calcium nickel phosphate when employed as a dehydrogenation catalyst under certain conditions effects an extremely high selectivity to the desired diolefin product with very little degradation of the feed stock. This type of catalyst however requires special treatment, particularly with regard to the regeneration thereof. First it should be noted that in normal fixed bed systems this catalyst under conditions of dehydrogenation deactivates in approximately 10 to 60 minutes, thus requiring frequent periodic regeneration. Further, this catalyst requires steam and large amounts of excess air or $O_2$ for regeneration. By excess air or $O_2$ it is meant over the stoichiometric amounts required to burn all of the carbonaceous deposits adhering to the catalyst. As is common with many other types of dehydrogenation catalysts steam is employed in large amounts during the dehydrogenation reaction primarily to control temperatures and extent of catalyst oxidation. Other catalysts which are contemplated to be used in the processes of the present invention include magnesia-iron oxide, magnesia-chromia, and zinc oxide-iron oxide.

In view of the rapid deactivation of dehydrogenation catalyst it has previously been proposed to employ a two-vessel fluid system. One of the vessels is the reactor in which the olefins or parafins are catalytically dehydrogenated and the other is for regeneration of the deactivated catalyst with steam and air or $O_2$. Thus the feed to the reactor containing active catalyst comprises large volumes of steam and the $C_4$–$C_6$ olefins or paraffins. On the other hand, not only steam is fed to the regenerator but large amounts of excess air or $O_2$ required for complete regeneration of the catalyst. The effluent from this regeneration zone will comprise not only steam but substantial quantities of air or $O_2$ not consumed by the deposits on the catalyst. Since air or $O_2$ is detrimental in the primary dehydrogenation reaction in that it burns $C_4$–$C_6$ feed, adversely affects the dehydrogenation reaction, and leads to the formation of undesirable reaction products, the effluent steam from the regeneration reactor cannot be used as such for the dehydrogenation reaction. It is evident therefore that considerable quantities of steam are used and cannot be recycled without major modifications of the system. Thus effluent steam from the regeneration is either lost or employed for less lucrative purposes such as in waste heat boilers or the like. Hence the fresh steam requirements have been large, resulting in operational difficulties and high costs. A second major problem is that both reactors in the two reactor system require cyclones or other apparatus to separate and return catalyst which may find its way to the top of the tower with diolefin product in the reactor and with spent regeneration gases in the regenerator.

It is an object of this invention to provide a process for the dehydrogenation of olefins and paraffins to diolefins employing a catalyst such as a calcium nickel phosphate catalyst whereby the fresh steam requirements are considerably lowered and whereby the need for cyclone or similar apparatus in the regenerator is eliminated. It is a further object of this invention to improve the catalyst activity and maintain a constant catalyst activity within the primary reactor. A still further object of this invention is to maintain a better heat balance and temperature control within the reactor whereby there is eliminated a $\Delta T$ across the catalyst bed. Elimination of the $\Delta T$ across the reactor and better catalyst activity allow operation at higher average reaction temperature, resulting in higher selectivity and conversion than possible in a fixed bed.

For a clearer understanding of the invention reference will now be had to the accompanying drawing which shows diagrammatically a flow plan of diolefin manufacture, depicting one preferred embodiment of this invention. Other systems such as transfer line reactors can be used in the reaction and/or regeneration step. A combined stream of $C_4$–$C_6$ olefins or paraffins or a single component such as butenes and steam which have previously been heated to the desired temperatures are fed by line 1 into reactor 2. Reactor 2 comprises a grid 3, a cyclone 4 and a fluidized calcium nickel phosphate catalyst bed. It is to be understood that the hydrocarbon and steam may be fed into reactor 2 at different points. Desired temperatures are maintained within the reactor 2 by controlling the temperatures of the feed and steam. Other means of controlling temperature such as catalyst circulation, regenerator temperature, variations in air or $O_2$ and fuel rate in the regenerator, as subsequently discussed, may also be employed. The specific composition of the catalyst will be described later; however, for purposes of this invention 80% of calcium nickel phosphate catalyst should be approximately within the 20–100 micron size with the remaining 20% being of either smaller or larger particle size, i.e. within the range of 5–20 to 100–200 microns. There is no particular criticality pertaining to the size of the present catalyst as long as it can be maintained in a fluidized state under the conditions of reaction. Reactor 2 also contains a withdrawal pipe 5 whereby principally catalyst is withdrawn from the reactor. Pipe 5 may contain baffles 6; packing or the like for the purpose of stripping any product which might tend to be carried over with the catalyst. Crude diolefin product is withdrawn overhead via line 7, having first been passed through cyclone 4 in order to free product from any entrained catalyst particles, the particles being returned to catalyst bed. Crude diolefin product from line 7 is then passed preferably to a quenching zone and finished by any of the known techniques such as compression, absorption and distillation, followed by cuprous ammonium acetate solvent extraction, etc. Additionally, if a combined stream is dehydrogenated, complicated separation steps to obtain desired pure products will usually be conducted. It is therefore preferred to dehydrogenate only a single component stream. The deactivated catalyst is fed via line 5 to a regenerator 8 also containing a grid 9 supporting a fluidized bed of regenerating catalyst. Steam and an oxygen containing gas at regeneration temperatures are continuously admitted to the regeneration zone 8 via line 10. The steam and air or $O_2$ may be injected at different points; however, the space velocity of the steam, air or $O_2$, hydrocarbon feed etc., in both the reactor and regenerator must be sufficient to maintain the catalyst bed in a fluidized state. The steam and excess air or $O_2$ at elevated temperatures effectively regenerate the catalyst bed within regenerator 8 and the gases together with regenerated catalyst are withdrawn from the regenerating zone via line 11.

To rid the effluent gases withdrawn by line 11 of air, or $O_2$ fuel is injected at any point subsequent to the regeneration such as through line 12. The burning of the fuel in the presence of air or $O_2$ also serves the purpose of supplying heat to the primary reactor 2. Excessively high temperatures which may result from burning the fuel may be lowered by the use of any cooling means such as the introduction of quench steam by line 13. The effluent steam rid of air and now containing other inert gases such as products of combustion and $N_2$ are fed by line 11 back to the primary reactor 2 in order to supplement the fresh steam feed injected via line 1. In the unusual situation where a cheap $O_2$ stream is available, it is preferred to use this stream rather than air since the large proportion of $N_2$ present in air increases the difficulty of separation of the desired diolefin product from other products from the dehydrogenation process. While a regeneration tower 8 has been shown, it is also possible to regenerate the catalyst in a transfer line if conditions are such that the rate of reaction is sufficiently rapid to permit adequate regeneration of the catalyst in the dilute phase transfer line. An important factor is that the fuel must be added subsequent to the regeneration and not during or prior to it. It will be noted that regenerator 8 contains no cyclone since the entire effluent comprising steam, inert gases and fluidized catalyst is recycled to the primary reactor 2.

For the purpose of amplifying on the disclosure and setting forth a specific embodiment, the following table sets forth the necessary operating conditions to produce butadiene from normal butenes according to the present invention:

TABLE I

*Conditions and reactants*

CATALYST

The preferred catalyst comprises:

|  | General (Wt. Percent) | Specific (Wt. Percent) |
| --- | --- | --- |
| Ni | 4 to 6 | 5 |
| Ca | 26 to 34 | 30 |
| $PO_4^\equiv$ | 46 to 63 | 57 |
| $Cr_2O_3$ | 0 to 8 | 6 |
| Graphite | 0 to 3 | 2 |
| Particle Size of Catalyst........microns.. | 5 to 200 | 20 to 100 |

It is to be understood that the critical components of this catalyst comprise nickel calcium phosphate, the graphite being merely a lubricant which is readily burned off under the elevated temperatures required for the dehydrogenation of butene. Chromia may be omitted entirely if desired.

The above mentioned components are the active constituents of the catalyst. Under certain conditions it may be desirable to use an inert carrier, such as MgO, ZnO, $Al_2O_3$, $SiO_2$, for the above catalyst to obtain more satisfactory fluidization properties. In that case the proportion of the above mixture to inert carrier may be anywhere from 5 : 95 to 50 : 50, preferably 10 : 90 to 25 : 75.

REACTION CONDITIONS

|  | General | Specific |
| --- | --- | --- |
| Space velocity of $nC_4$-, v./v./hr.[1] | 75-500 | 120 |
| Space velocity of steam, v./v./hr.[1] | 1,400-10,000 | 2,300 |
| Average reactor temp., °F | 1,000-1,350 | 1,175 |
| Temp. drop across reactor, °F | None | None |
| Reactor outlet pressure, p.s.i.a | 15-30 | 20 |
| n-butylene conversion, percent per pass | 30-75 | 40 |
| Selectivity to butadiene, percent | 75-95 | 85 |
| Rate of flow through line 5 (in terms of reactor catalyst inventory per hour) | 1-20 | 4 |

REGENERATION AND BURNER CONDITIONS

|  | General | Specific |
| --- | --- | --- |
| Space velocity of steam, v./v./hr.[1] | 500-1,000 | 675 |
| Space velocity of air, v./v./hr.[1] | 75-150 | 105 |
| Average regenerator temp., °F | 1,000-1,300 | 1,175 |
| Temp. of effluent gases, °F | 1,000-1,300 | 1,175 |
| Outlet pressure, p.s.i.a | 25-50 | 30 |
| Fuel gas to burner (of typical composition shown below), v./v./hr | 8-12 | 9 |

[1] V./v./hr.—Volume of gas at S.T.P./volume catalyst/hour where volume of catalyst is expressed in terms of equal weight of fixed bed catalyst at 40 lb./c.f.

The same catalyst and all the above reaction and regeneration conditions are also used in the process for producing isoprene from isopentenes or isopentanes except that reaction temperatures in the upper part of the range given are preferred and a specific inlet temperature would thus be higher than that given, e.g. 1215° F. for isopentene and 1340° F. for the conversion of isopentane. Also, with respect to isopentane, conversions per pass rather than 30-60% are only 10-20%. However, since isopentane is comparatively inexpensive, the process is still attractive.

The same catalyst and all the Table I reaction and regeneration conditions including the specific conditions are also applicable to the conversion of 2,3-dimethyl butenes and 2,3-dimethyl butane to 2,3-dimethyl butadiene.

In order to burn all of the air or $O_2$ in the regenerator effluent gas, an excess of fuel is desirably employed in order to insure complete elimination of any free oxygen under the normal fluctuations in air rate occurring in the normal operation of the unit. Any carbonaceous fuel, either gaseous, solid or liquid, may be used; however, for the sake of economy natural or refinery gases are preferably employed. A typical natural gas comprises:

| Hydrocarbon: | Mole percent |
| --- | --- |
| $C_1$ | 40 |
| $C_2$ | 40 |
| $C_3$ | 20 |

Any fuel gas not consumed by the burning will be converted by the water gas reaction to $H_2$, $CO_2$ and CO, which are not deleterious to the main dehydrogenation reaction when present in small quantities. Preferably, 20 to 50% excess fuel with respect to the free oxygen in the air is employed.

The regeneration gas effluent and fuel may be brought together by simple mixing followed by or simultaneous with quenching. The combustion and some quenching if necessary may be carried out in the transfer line. A reforming or oxidation catalyst may also be provided if desired to insure complete oxygen removal.

In the event that the gaseous effluent from the burner is at a higher temperature than desired for the reaction, the effluent may be quenched with 300° to 500° F. steam. A typical effluent from the burner after quenching with steam would have the following composition:

| Component: | Mole percent |
|---|---|
| $H_2O$ | 91.6 |
| $N_2$ | 6.5 |
| CO | .01 |
| $CO_2$ | 1.2 |
| $H_2$ | .7 |

The products of combustion as well as nitrogen and carbon monoxide are inert to the reaction thus permitting recycle to the dehydrogenation zone. By this recycle there is accomplished a considerable reduction of fresh steam requirements and the elimination of cyclone or other separating apparatus on the regenerator.

While the foregoing operations have served to illustrate specific applications of this invention, other modifications obvious to those skilled in the art are encompassed within the scope of the invention as defined by the appended claims.

What is claimed is:

1. An improved process for dehydrogenating $C_4$–$C_6$ hydrocarbons more highly saturated than diolefins to diolefins which comprises passing said hydrocarbons and steam into a reaction zone containing a fluidized bed of dehydrogenation catalyst, maintaining elevated temperatures within said reaction zone, continuously withdrawing deactivated catalyst from said zone, passing deactivated catalyst from said zone to a regeneration zone, contacting said deactivated catalyst with steam and an excess of oxygen containing gas at elevated temperatures for a time sufficient to regenerate the catalyst, subsequently consuming the unused oxygen in said excess of oxygen containing gas in the effluent from said regeneration zone by burning fuel in the presence thereof and also in the presence of regenerated catalyst and steam, recycling the product from said burning step comprising a mixture of regenerated catalyst, steam and gaseous products of combustion to the reaction zone, said mixture being substantially free of free oxygen and withdrawing diolefin product from an upper portion of said reaction zone.

2. An improved process for dehydrogenating a particular $C_4$–$C_6$ hydrocarbon more highly saturated than a diolefin to its corresponding diolefin which comprises passing said particular hydrocarbon and steam into a reaction zone containing a fluidized bed of dehydrogenation catalyst, maintaining elevated temperatures within said reaction zone, continuously withdrawing deactivated catalyst from said zone, passing deactivated catalyst from said zone to a regeneration zone, contacting said deactivated catalyst with steam and an excess of oxygen containing gas at elevated temperatures for a time sufficient to regenerate the catalyst, subsequently consuming the unused oxygen in said excess of oxygen containing gas in the effluent from said regeneration zone by burning fuel in the presence thereof and also in the presence of regenerated catalyst and steam, recycling the product from said burning step comprising a mixture of regenerated catalyst, steam and gaseous products of combustion to the reaction zone, said mixture being substantially free of free oxygen and withdrawing diolefin product from an upper portion of said reaction zone.

3. An improved process for dehydrogenating butene to butadiene which comprises passing a mixture of preheated butene and steam into a lower portion of a reaction zone containing a bed of a calcium nickel phosphate comprising catalyst at a space velocity sufficient to maintain the bed in a fluidized state, withdrawing deactivated catalyst from said reaction zone, stripping gases from said deactivated catalyst and passing the stripped deactivated catalyst to a regeneration zone, contacting deactivated catalyst with steam and excess amounts of air at velocities sufficient to maintain the deactivated catalyst in a fluidized state and at elevated temperatures sufficient to regenerate the catalyst, recovering effluent from said regeneration zone, subsequently burning fuel in the presence of a mixture of said catalyst and entire gaseous effluent to consume substantially all of the free oxygen contained therein, passing the mixture of regenerated catalyst, inert gases, and steam substantially free of oxygen to the reaction zone, said inert gases including gases withdrawn from said regeneration zone and those formed subsequently by said burning of fuel, separating entrained solids from crude butadiene product, withdrawing crude butadiene product from said reaction zone, and recovering crude butadiene product.

4. A method in accordance with claim 3 wherein temperatures within said reaction and regeneration zones are maintained at about 1000° to 1300° F.

5. A method in accordance with claim 3 wherein the temperature of the steam and regenerated catalyst mixture during the burning step is maintained at about 1000° to 1300° F. by quenching the mixture with steam.

6. A method in accordance with claim 3 wherein said catalyst comprises:

| | Wt. percent |
|---|---|
| Ni | 4–6 |
| Ca | 26–34 |
| $PO_4\equiv$ | 46–63 |
| $Cr_2O_3$ | 0–8 |
| Lubricant | 0–3 |

7. An improved process for dehydrogenating butene to butadiene which comprises passing butene feed and steam into a reaction zone containing a fluidized bed of catalyst comprising calcium nickel phosphate, maintaining elevated temperatures within said reaction zone, continuously withdrawing deactivated catalyst from said zone, passing deactivated catalyst from said zone to a regeneration zone, contacting said deactivated catalyst with steam and excess air, at elevated temperatures for a time sufficient to regenerate the catalyst, subsequently consuming the unused air in the effluent from said regeneration zone by burning fuel in the presence thereof and also in the presence of regenerated catalyst, inert gases, and steam, recycling the mixture of regenerated catalyst, inert gases, and steam with other gaseous products of combustion to the reaction zone, said mixture being substantially free of air and withdrawing butadiene product from an upper portion of said reaction zone.

8. A method in accordance with claim 7 wherein said catalyst comprises:

| | Wt. percent |
|---|---|
| Ni | 4–6 |
| Ca | 26–34 |
| $PO_4\equiv$ | 46–63 |
| $Cr_2O_3$ | 0–8 |
| Lubricant | 0–3 |

9. An improved process for dehydrogenating isopentenes to isoprene which comprises passing isopentene feed into a reaction zone containing a fluidized bed of catalyst comprising calcium nickel phosphate, maintaining elevated temperatures within said reaction zone, continuously withdrawing deactivated catalyst from said zone, passing deactivated catalyst from said zone to a regeneration zone, contacting said deactivated catalyst with steam and excess air, at elevated temperatures for a time sufficient to regenerate the catalyst, subsequently consuming the unused air in the effluent from said regeneration zone by burning fuel in the presence thereof and also in the presence of regenerated catalyst, inert gases, and steam, recycling the mixture of regenerated catalyst, inert gases, and steam with other gaseous products of combustion to the reaction zone, said mixture being substantially free of air and withdrawing isoprene product from an upper portion of said reaction zone.

10. An improved process for dehydrogenating isopentane to isoprene which comprises passing isopentane feed and steam into a reaction zone containing a fluidized bed of catalyst comprising calcium nickel phosphate, maintaining elevated temperatures within said reaction zone, continuously withdrawing deactivated catalyst from said zone, passing deactivated catalyst from said zone to a regeneration zone, contacting said deactivated catalyst with steam and excess air, at elevated temperatures for a time sufficient to regenerate the catalyst, subsequently consuming the unused air in the effluent from said regeneration zone by burning fuel in the presence thereof and also in the presence of regenerated catalyst and steam, recycling the mixture of regenerated catalyst and steam to the reaction zone, said mixture being substantially free of air and withdrawing isoprene product from an upper portion of said reaction zone.

11. An improved process for dehydrogenating 2,3-dimethyl butane to 2,3-dimethyl butadiene which comprises passing 2,3-dimethyl butane feed and steam into a reaction zone containing a fluidized bed of catalyst comprising calcium nickel phosphate, maintaining elevated temperatures within said reaction zone, continuously withdrawing deactivated catalyst from said zone, passing deactivated catalyst from said zone to a regeneration zone, contacting said deactivated catalyst with steam and excess air, at elevated temperatures for a time sufficient to regenerate the catalyst, subsequently consuming the unused air in the effluent from said regeneration zone by burning fuel in the presence thereof and also in the presence of regenerated catalyst and steam, recycling the mixture of regenerated catalyst and steam to the reaction zone, said mixture being substantially free of air and withdrawing 2,3-dimethyl butadiene product from an upper portion of said reaction zone.

12. An improved process for dehydrogenating 2,3-dimethyl butenes to 2,3-dimethyl butadienes which comprises passing 2,3-dimethyl butenes and steam into a reaction zone containing a fluidized bed of catalyst comprising calcium nickel phosphate, maintaining elevated temperatures within said reaction zone, continuously withdrawing deactivated catalyst from said zone, passing deactivated catalyst from said zone to a regeneration zone, contacting said deactivated catalyst with steam and excess air, at elevated temperatures for a time sufficient to regenerate the catalyst, subsequently consuming the unused air in the effluent from said regeneration zone by burning fuel in the presence thereof and also in the presence of regenerated catalyst and steam, recycling the mixture of regenerated catalyst and steam to the reaction zone, said mixture being substantially free of air and withdrawing 2,3-dimethyl butadienes product from an upper portion of said reaction zone.

References Cited in the file of this patent
UNITED STATES PATENTS

| | | |
|---|---|---|
| 2,456,367 | Britton et al. | Dec. 14, 1948 |
| 2,456,368 | Britton et al. | Dec. 14, 1948 |
| 2,542,813 | Heath | Feb. 20, 1951 |
| 2,641,619 | Noddings | June 9, 1953 |
| 2,672,490 | Roetheli | Mar. 16, 1954 |